April 24, 1928.  
T. WALSH ET AL  
1,667,274

FLUID SPEED TRANSMITTING MECHANISM

Filed Dec. 22, 1925      4 Sheets-Sheet 2

WITNESSES:

INVENTORS:
Timothy Walsh,
Harry S. Coover,
John V. Abronski.
BY
their ATTORNEY.

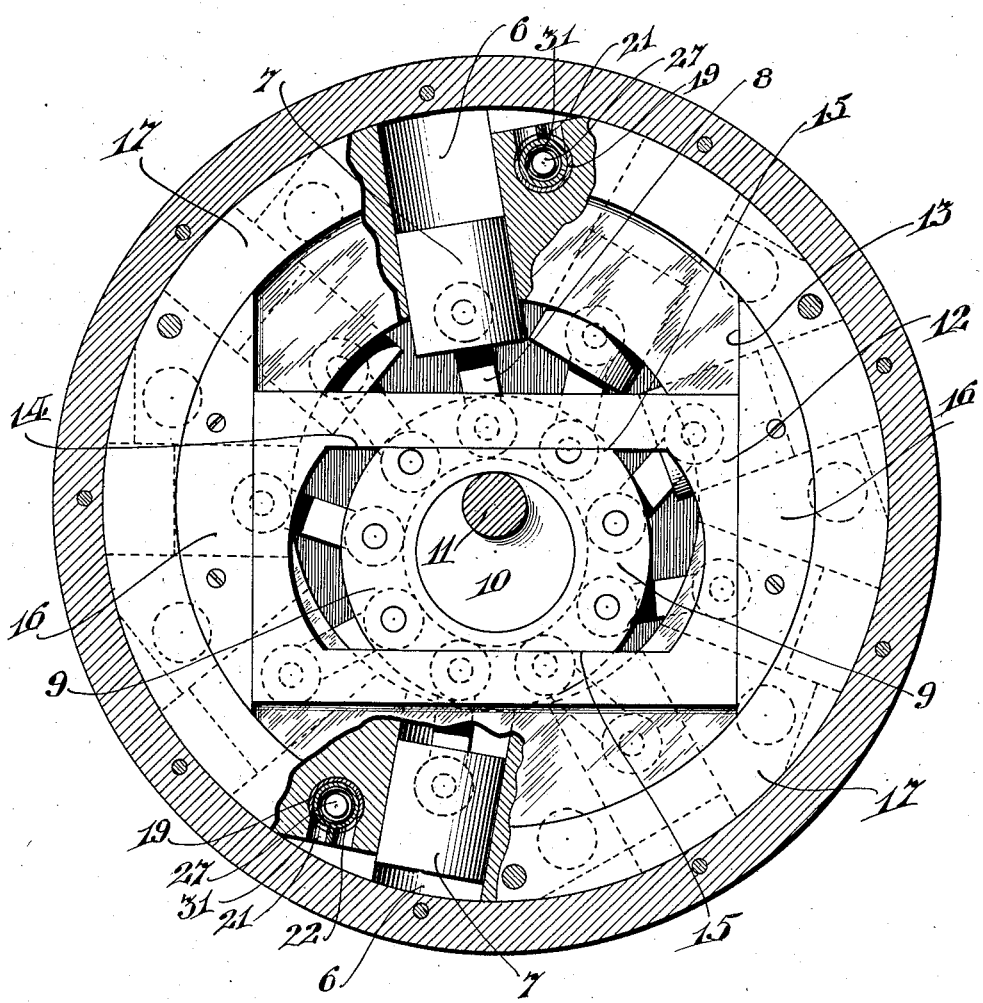

April 24, 1928.

T. WALSH ET AL 1,667,274

FLUID SPEED TRANSMITTING MECHANISM

Filed Dec. 22, 1925    4 Sheets-Sheet 4

WITNESSES:
Alfred E. Ischinger
Elizabeth Garhe

INVENTORS.
Timothy Walsh,
Harry S. Coover,
John V. Abronski,
BY Joshua R. H. Potts
their ATTORNEY.

Patented Apr. 24, 1928.

1,667,274

UNITED STATES PATENT OFFICE.

TIMOTHY WALSH, HARRY S. COOVER, AND JOHN V. ABRONSKI, OF PHILADELPHIA, PENNSYLVANIA.

FLUID SPEED TRANSMITTING MECHANISM.

Application filed December 22, 1925. Serial No. 76,959.

Our invention relates to fluid speed transmitting mechanism, and the object of our invention is to provide improved controlling means for the inlet and outlet ports whereby they may be gradually and easily opened and closed without causing shocks, jars or vibrations.

Figure 1:
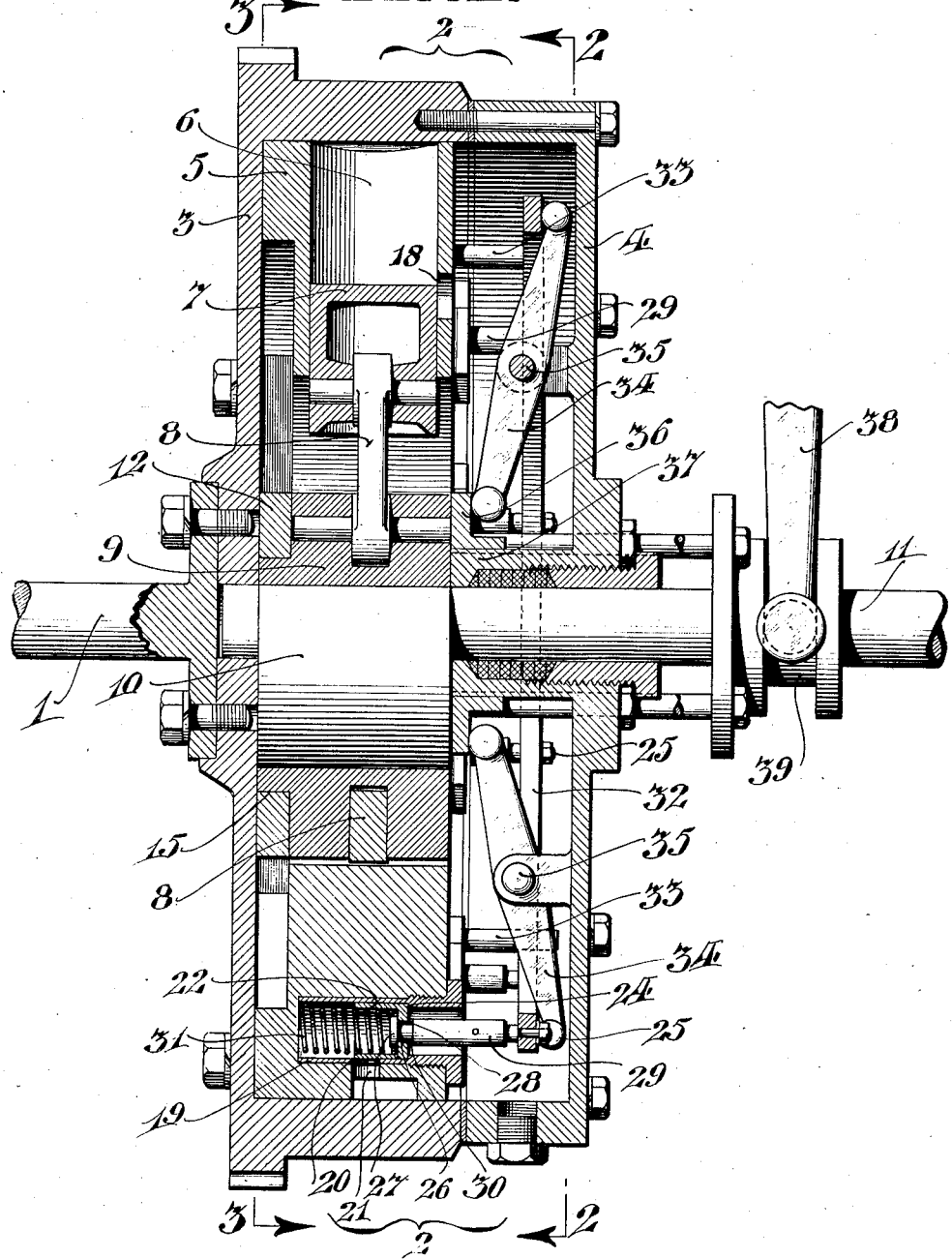
Figure 2:
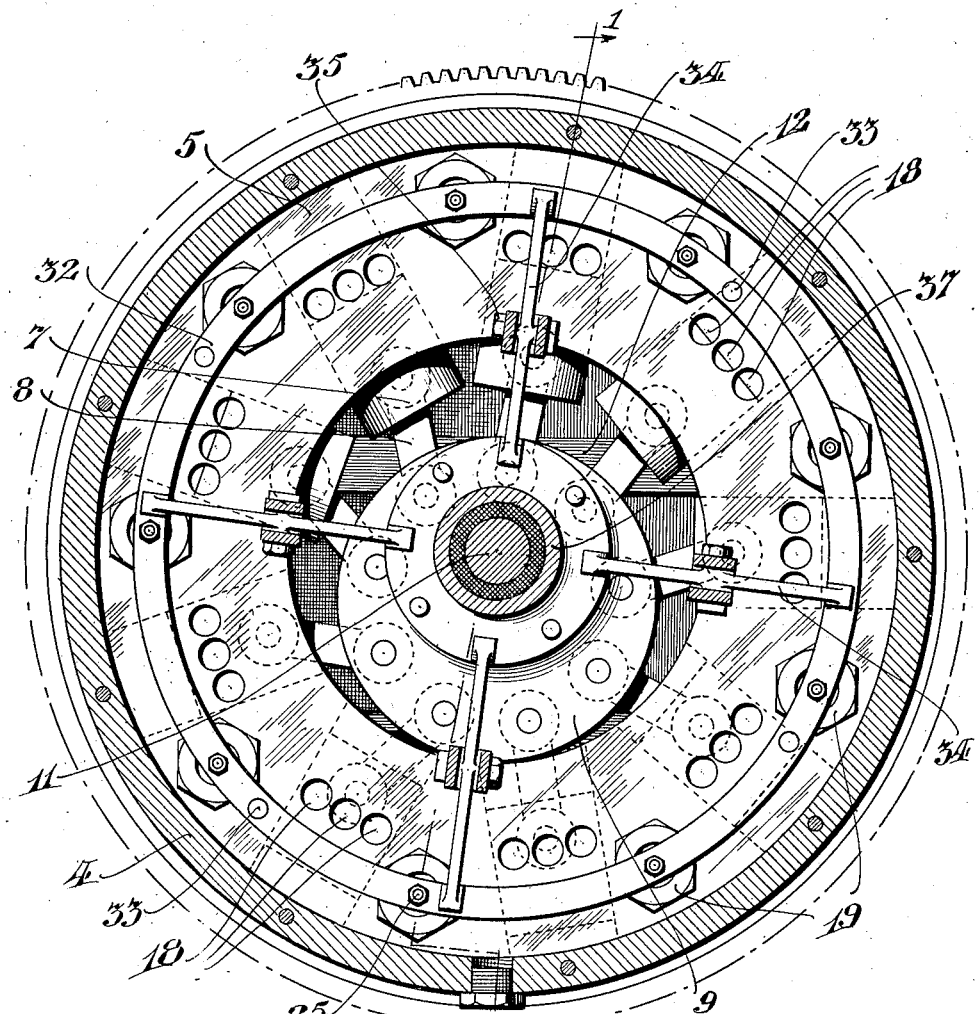
Figure 7:
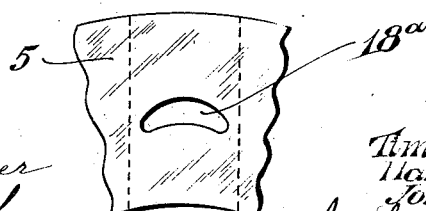
Figure 4:
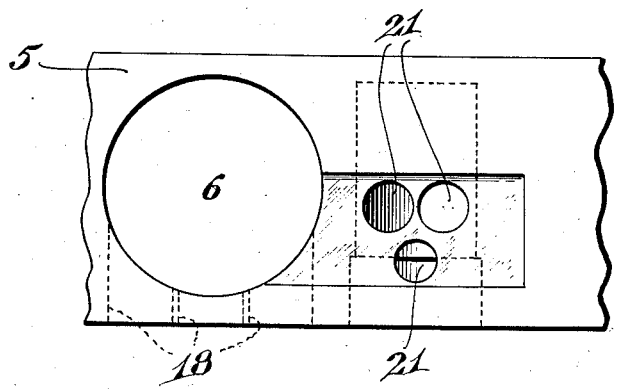
Figure 5:
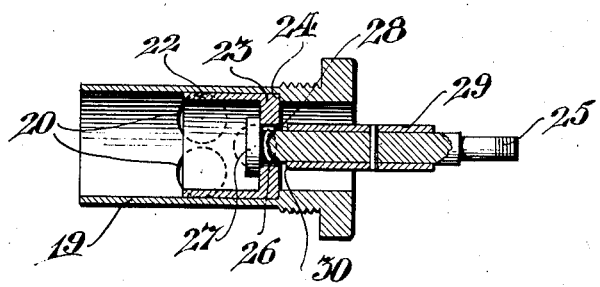
Figure 6:
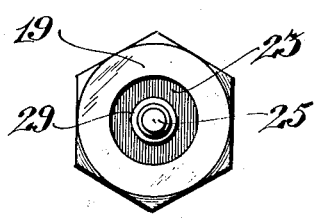
Figure 8:
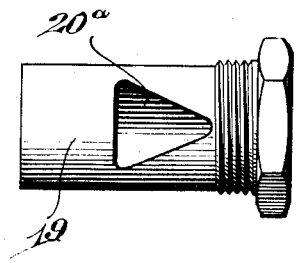

This object, and other advantageous ends which will be described hereinafter, we attain in the following manner, reference being had to the accompanying drawings in which Figure 1 is a central section on line 1—1 of Figure 2 through speed transmitting mechanism embodying our invention, Figure 2 a section on line 2—2 of Figure 1, Figure 3 a section on line 3—3 of Figure 1 the gear teeth on the fly wheel being omitted, Figure 4 a fragmentary view of the periphery of a circular cylinder block showing the outlet ports, Figure 5 a detail of the outlet valve, Figure 6 an end view of the controlling mechanism for the outlet ports, Figure 7 a detail showing a modified form of inlet ports, and Figure 8 a detail showing a modified form of outlet ports.

We have illustrated our improvements and will describe them as applied to fluid transmitting mechanism of the general type disclosed in an application of Timothy Walsh and Harry S. Coover, Serial No. 3,728, filed January 21, 1925.

Referring to the drawings, 1 indicates a driving shaft, 2 an oil-tight casing made in sections 3 and 4 connected by bolts, 5 a circular block fitted in and secured to the casing section 3 and having a series of radially extending cylinders 6 closed at their outer ends by casing section 3, 7 pistons slidable in the cylinders, 8 links pivotally connected with the pistons and 9 a collar connected with the links and rotatable on an eccentric 10 fixed to a driven shaft 11 rotatable in the casing. Collar 9 is connected to cylinder block 5 by a guide 12 slidable in a guideway 13 between the cylinder block and section 3 and having a guide slot 14 slidably fitting faces 15 on collar 9.

The guideway 13 is preferably provided by brasses 16 of segment form reinforced by an annular part 17 of the cylinder block. Cylinders 6 are provided with an inlet port or ports 18. We have shown in Figure 2 three ports in each cylinder, the ports being disposed in a circle concentric with the driving shaft. In Figure 7 we have shown a single port 18$^a$ of crescent shape. Cylinder block 5 is bored adjacent each of the cylinders to receive a threaded sleeve 19 provided with an outlet port or ports 20. We have shown in Figures 4 and 5 three ports disposed in a triangle and, in Figure 8, a single port 20$^a$ of triangular shape. These ports communicate with ports 21 which communicate with the outer end of the adjacent cylinder. Within sleeve 19 a sleeve 22, having an internal annular flange 23, is slidably mounted, its outward movement relatively to the cylinder block being limited by an internal shoulder 24 on sleeve 19. A valve stem 25 projects through the central opening 26, formed by flange 23, and carries a valve head 27 for which the flange forms a seat, a space 28 being left between the stem and the wall of the opening. A sleeve 29, fixed to the valve stem, provides a shoulder 30 which, when the valve is closed, is spaced from flange 23 but is adapted, when the valve stem is moved inwardly, to engage the flange and move sleeve 22 which is normally held in engagement with shoulder 30 by a spring 31. The valve stems 25 are secured to and are moved in and out by a ring 32 slidably mounted on pins 33 extending from the cylinder block. Ring 32 is moved in and out by levers 34 fulcrumed at 35 and having one end abutting ring 32 and the other end abutting a flanged collar 36 slidable on a boss 37 extending inwardly from casing section 4. Collar 36 is moved in and out by a lever 38 connected with a grooved collar 39 secured to flanged collar 36.

Rotation of the cylinder block relatively to shaft 11 will reciprocate the pistons. Collar 9 receives rotation from the cylinder block during which guide 12 slides in one direction on the cylinder block while collar 9 slides in slot 14 at right angles to that direction.

In operation, with the casing filled with fluid and the valves open, the mechanism will rotate about eccentric 10 without rotating it. The fluid will circulate through inlet ports 18 into the cylinders, and from the cylinders through ports 21, sleeves 19 and the outlet ports 20 back to the casing. If circulation of the oil is resisted by partly closing the outlet valves, outward movement of the pistons will be resisted and they will tend to rotate eccentric 10 and shaft 11. When the outlet valves are fully closed the pistons will be locked against outward movement and the full rotation of the cylinder block will be transmitted to the eccentric.

With the inlet ports 18 arranged as described, these ports are opened and closed very gradually by the action of pistons 7.

The initial inward motion of valve stems 25, for stopping the machine, moves the comparatively small valve disks 27 from their seats upon flanges 23 without moving sleeves 22 and opens a passageway through spaces 28 thereby relieving the outward pressure upon flanges 23. Further movement of the valve stems brings shoulders 30 into engagement with flanges 23 and forces sleeves 22 inwardly, thereby first gradually opening the ports 20 which form the apices of the triangles, then gradually opening the remaining ports 20. Upon reverse movement of the valve stems to start the machine, sleeves 22 will first close a wide area and then a gradually decreasing area of the port or ports. We have found this to be an important factor.

While we have described our invention as taking a particular form, it will be understood that the various parts may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:—

1. In fluid transmitting mechanism of the character described, inlet controlling mechanism consisting of a series of piston cylinders having ports in their peripheries and pistons mounted to reciprocate in the cylinders and adapted to close and open the ports, and outlet controlling mechanism comprising individual units for each of said cylinders, sleeves in said units, means for actuating said sleeves, said means being arranged to function preliminarily for removing resisting pressure without actuating said sleeves and to immediately thereafter actuate said sleeves.

2. In fluid transmitting mechanism of the character described, a rotatable block having a series of radially extending cylinders therein, and pistons mounted to reciprocate in the cylinders, the cylinder walls being provided with inlet ports of gradually increasing then decreasing area, outlet controlling mechanism comprising an individual sleeve for each cylinder disposed in a bore adjacent thereto, ports of gradually decreasing area in said bores, means for moving said sleeves inwardly and outwardly in said bores to open and close said ports, said means being adapted to relieve pressure against the sleeves.

3. In fluid transmitting mechanism of the character described, a driving shaft; a rotatable block having a series of radially extending cylinders therein, the cylinder walls being provided with inlet ports of gradually increasing then decreasing area, and pistons mounted to reciprocate in the cylinders and adapted to close and open the ports, outlet means including ports in the cylinder walls and individual units for each cylinder, each unit having a series of openings in the form of a triangle, and means moving inwardly and outwardly in said units for interconnecting said ports and openings.

4. In fluid speed transmitting mechanism of the character described including a cylinder block having a series of piston cylinders therein and pistons mounted to reciprocate therein, outlet controlling mechanism consisting of sleeves disposed in bores in the cylinder block adjacent the piston cylinders and provided with ports of gradually decreasing area communicating with the outer ends of the cylinders; said sleeves being controlled by means adapted to open said ports when said sleeves are moved into the bores and to close said ports when the sleeves are moved in the opposite direction.

5. In fluid speed transmitting mechanism of the character described including a cylinder block having a series of piston cylinders therein and pistons mounted to reciprocate therein, outlet controlling mechanism consisting of sleeves disposed in bores in the cylinder block adjacent the piston cylinders and provided with a plurality of peripheral ports communicating with the outer ends of the cylinders; sleeves slidably mounted therein and having internal flanges providing valve seats and valve ports; valve stems extending through the valve ports and provided with valve disks adapted to close the valve ports; shoulders on the valve stems, spaced from the valve disks, whereby inward movement of the valve stems will first move the disks to open the valve ports and then move the sleeves to open the peripheral ports, and means for actuating the valve stems.

6. In fluid speed transmitting mechanism of the character described including a cylinder block having a series of piston cylinders therein and pistons mounted to reciprocate therein, outlet controlling mechanism consisting of sleeves disposed in bores in the cylinder block adjacent the piston cylinders and provided with a plurality of peripheral ports communicating with the outer ends of the cylinders; sleeves slidably mounted therein and having internal flanges providing valve seats and valve ports; valve stems extending through the valve ports and provided with valve disks adapted to close the valve ports; shoulders on the valve stems, spaced from the valve disks, whereby inward movement of the valve stems will first move the disks to open the valve ports and then move the sleeves to open the peripheral ports; springs pressing the flanged sleeves toward the shoulders, and means for actuating the valve stems.

7. Fluid speed transmitting mechanism including a casing; a block mounted therein provided with a series of radial cylinders and having a circular recess therein opposing the casing; segment shaped brasses secured within the recess and forming a guideway, pistons slidable in the cylinders; means for controlling admission of fluid to and discharge of fluid from the cylinders; a shaft, an eccentric on the shaft; a collar on the eccentric, and a guide slidable in the guideway and slidably connected with the collar.

8. Power transmission means comprising a driving shaft, a shaft adapted to be driven, a casing having a series of piston cylinders with ports in their peripheries, pistons adapted to reciprocate in the cylinders to open and close said ports, said pistons being connected to a ring slidable in a guide in one direction, an eccentric within the ring, said guide being slidable in a transverse direction, means for allowing liquid in the casing to flow through said ports and cause the rotation of the ring in said guide and the movement of the guide in the transverse direction, said means being adapted to control the flow of liquid so that the power source used to drive said pistons is applied to the eccentric to drive said shaft.

In testimony whereof we have signed our names to this specification.

TIMOTHY WALSH.
HARRY S. COOVER.
JOHN V. ABRONSKI.